United States Patent
Powell (10) Patent No.: US 6,731,274 B2
(45) Date of Patent: *May 4, 2004

(54) DISPLAY BRIGHTNESS CONTROL METHOD AND APPARATUS FOR CONSERVING BATTERY POWER

(75) Inventor: John P. Powell, North Sioux City, SD (US)

(73) Assignee: Gateway, Inc., Poway, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/439,062

(22) Filed: May 15, 2003

(65) Prior Publication Data

US 2003/0193472 A1 Oct. 16, 2003

Related U.S. Application Data

(63) Continuation of application No. 09/428,881, filed on Oct. 28, 1999, now Pat. No. 6,618,042.

(51) Int. Cl.[7] .................................................. G09G 3/36
(52) U.S. Cl. ....................................... 345/204; 345/211
(58) Field of Search ............................... 345/204, 211, 345/87, 102, 147, 156

(56) References Cited

U.S. PATENT DOCUMENTS

| | | | |
|---|---|---|---|
| 5,164,849 A | 11/1992 | Evans et al. .................. | 359/45 |
| 5,295,048 A | 3/1994 | Park et al. .................... | 362/26 |
| 5,489,918 A | 2/1996 | Mosier ......................... | 345/89 |
| 5,567,030 A | 10/1996 | Shin ............................ | 353/85 |
| 5,819,100 A * | 10/1998 | Pearce ......................... | 713/323 |
| 5,925,129 A * | 7/1999 | Combs et al. ............... | 713/300 |
| 5,956,014 A * | 9/1999 | Kuriyama et al. .......... | 345/690 |
| 2002/0122020 A1 * | 9/2002 | Moon et al. .................. | 345/89 |

FOREIGN PATENT DOCUMENTS

| | | | | |
|---|---|---|---|---|
| JP | 64-035480 | 2/1989 | ............ | G09G/1/00 |
| JP | 04-055923 | 2/1992 | ........... | G06F/3/147 |
| JP | 04-309109 | 10/1992 | ............. | G06F/1/26 |
| JP | 05-276656 | 10/1993 | ............. | H02J/1/00 |
| JP | 06-019444 | 1/1994 | ............ | G09G/5/10 |
| JP | 07-141075 | 6/1995 | ............. | G06F/1/32 |
| JP | 09-026837 | 1/1997 | ............. | G06F/1/32 |
| JP | 11-119877 | 4/1999 | ............. | G06F/1/32 |

OTHER PUBLICATIONS

*Weber's Law of Just Noticeable Differences*, http://www.usd.edu/psyc301/WebersLaw.htm; May 15, 2003, 4 pages.

*Perception of Brightness, The Physics and Psychophysics . . .* , http://www.cs.ubc.ca/~harrison/P202/PDF/05–perception–of–brightness–4up.pdf; May 14, 2003, 12 pages.

* cited by examiner

Primary Examiner—Richard Hjerpe
Assistant Examiner—Ronald Laneau
(74) Attorney, Agent, or Firm—Scott Charles Richardson; R. Christopher Rueppell; Suiter-West (57) ABSTRACT

A method and apparatus for reducing display brightness on a portable computer when a user switches from an AC adapter to a battery power source provide battery power conservation. The reduction in display brightness is performed gradually so that a sudden brightness drop is not detected by the user. The display brightness reduction is preferably performed sufficiently gradually so that the reduction in brightness is virtually unnoticeable to the human eye.

16 Claims, 5 Drawing Sheets

DISPLAY BRIGHTNESS CONTROL METHOD AND APPARATUS FOR CONSERVING BATTERY POWER

CROSS REFERENCE TO RELATED APPLICATION

The present application is a Continuation, claiming priority under 35 U.S.C. § 120, of U.S. application Ser. No. 09/428,881 filed on Oct. 28, 1999 now U.S. Pat. No. 6,618,042, which received a Notice of Allowance on Mar. 21, 2003. The Allowed U.S. application Ser. No. 09/428,881 is herein incorporated by reference in its entirety.

FIELD OF THE INVENTION

The present invention relates generally to the control of LCD brightness for a portable computer and, more particularly, to a method and apparatus for conserving computer battery power by gradually reducing LCD brightness when the power supply is switched from the AC adapter to the battery.

BACKGROUND OF THE INVENTION

Portable computers such as laptop or notebook computers typically draw power from one or more batteries or battery packs. One of the major shortcomings of the use of portable computers in a mobile setting, i.e., where there is no access to an AC power source, is the limited work time that may be obtained from the computer's batteries. In order to maximize the work time that may be obtained from a battery charge, various power management or power conservation schemes have been implemented.

Portable computers typically have the capability to detect whether the computer is drawing power from an external power source, such as an AC adapter, or an internal battery power source. Since most power management techniques will affect computer performance, they are usually implemented when the computer is running on battery power. One such power conservation technique is to decrease the display brightness level when the computer is operating on batteries. It is also known to lower the central processing unit (CPU) operating speed when the computer is operating on batteries.

Other power management techniques may be employed regardless of whether the computer is using power from an AC adapter or batteries and involve turning off portions of the system after prespecified periods of nonuse. Such techniques include turning off or spinning down the hard disk drive after a prespecified period of nonuse; turning the display off after a prespecified period of nonuse; entering a low power sleep or standby mode (e.g., wherein the processor is temporarily shut down and the contents saved to memory after a prespecified period of nonuse); and turning off the entire system after a prespecified period of nonuse. The difference between AC adapter usage and battery usage in implementing the aforementioned power conservation techniques is that time periods are typically much shorter when the computer is operating on batteries.

Although nearly all of the aforementioned techniques increase the work time that may be obtained from the batteries, they do so at the expense of performance, for example, increasing user wait time when components that were turned off for power conservation are turned back on. Power management schemes which operate by decreasing LCD screen brightness when the computer is switched from AC power to battery power typically reduce brightness on the order of 50%. The reduction occurs when the AC adapter, or the power connection therefrom, is removed. In current systems applying a screen dimming feature, the user notices an immediate brightness reduction upon removal of the AC adapter. Of the various power saving techniques, reducing screen brightness has no effect on performance in terms of causing additional wait time, yet it is the most readily and immediately apparent to the user. Because screen brightness has heretofore been implemented by means of a sudden and marked change in screen brightness, a user may, upon noticing the decrease in brightness, manually increase the brightness or otherwise deactivate the feature, thus defeating the valuable power saving purpose of the display brightness reduction.

SUMMARY OF THE INVENTION

It would, therefore, be desirable to provide a display brightness control method and apparatus that eliminates any sudden drop in brightness. In accordance with the present invention, if the display brightness reduction is performed gradually so that it will be substantially unnoticeable to the user, the user will be less likely to manually increase display brightness when changing from an AC adapter power source to a battery power source.

In an embodiment, the present invention provides a display brightness control method and apparatus wherein screen brightness level reduction is performed sufficiently gradually so that the user does not notice a sudden brightness drop. In a preferred embodiment, the display brightness reduction is performed sufficiently gradually such that the brightness reduction is virtually unnoticeable to the human eye.

The display brightness control method and apparatus in accordance with this teaching may be implemented as a part of a power management system and method that optionally further includes additional power saving features.

The present invention employs a software or firmware routine that changes the display brightness level from a first brightness level to a second brightness level and that incorporates a limit in the rate of display brightness change over a period of time. The first brightness level will typically be a user selected brightness level or may be a default brightness level set when the computer is operating on AC power (hereinafter referred to as user selected brightness level). The second brightness level is a target brightness level which is deemed to power savings when the computer is operated on battery power, and may be a predetermined or fixed brightness level, a brightness level selected by the user for power savings, or may be defined as a brightness that is a certain percentage or brightness increment lower than the user selected brightness level. The time period over which the brightness reduction occurs is such that the brightness decrease does not appear as a sharp or sudden drop in brightness. In preferred embodiments, the time period is such that the drop in display brightness goes unnoticed or substantially unnoticed by the user. The time period over which the change in display brightness occurs may be any time period which would not cause a user to notice a sharp or sudden reduction in display brightness, and may be variable, for example, depending on the difference between the first and second brightness levels. The time period over which the brightness reduction occurs preferably ranges from about five seconds to a value on the order of tens of minutes, or longer. The time period more preferably ranges from about ten seconds to about twenty minutes or longer, and, most preferably, ranges from about ten seconds to about ten minutes. The target brightness level may be a fixed level or a level selectable by a user. The time period may also be variable, with larger time periods specified where larger changes in brightness level must be effected in order to reduce the display brightness from the user setting to the power saving target level, and the shorter time periods used where the change in brightness level is relatively small.

It is to be understood that both the foregoing general description and the following detailed description are exemplary and explanatory only and are not restrictive of the invention as claimed.

The accompanying drawings, which are incorporated in and constitute a part of the specification, illustrate various embodiments of the invention and, together with the general description, serve to explain the principles of the invention.

BRIEF DESCRIPTION OF THE DRAWINGS

The detailed description of the invention may be best understood when read in reference to the accompanying drawings wherein.

DETAILED DESCRIPTION OF THE INVENTION

Figure 1:
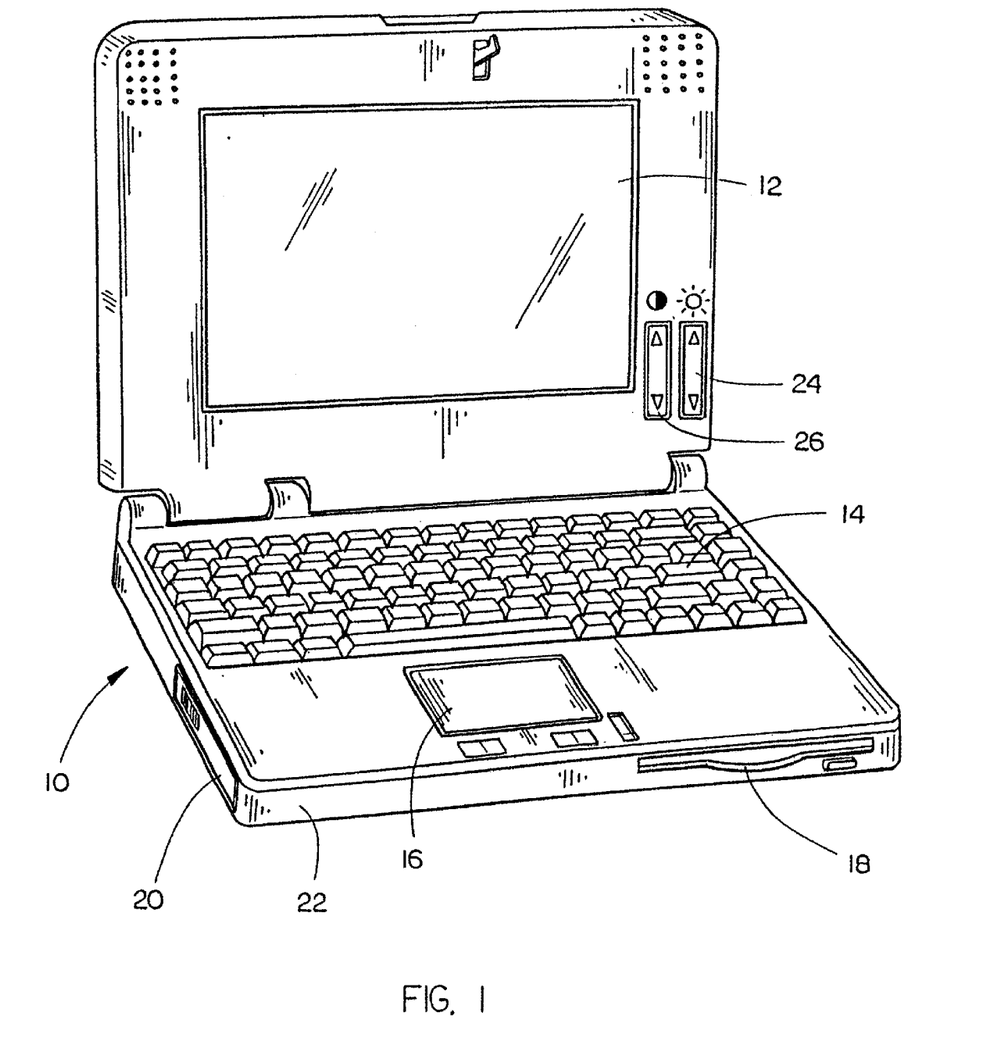
FIG. 1 shows a pictorial view of typical notebook computer of the type which may advantageously employ the display brightness control according to the present invention.

Referring now to FIG. 1, there is shown a typical notebook computer 10 which may advantageously employ the battery power conservation method and apparatus according to the present invention. Computer 10 is shown with an LCD display 12, keyboard or keypad area 14, pointing device 16, floppy drive 18. It will be recognized that computers of this type are available in a variety of configurations, and the present invention is not limited to any particular configuration. For example, computer 10 may lack particular items shown such as floppy drive 18, and may have included additional components such as a hard disk drive, modem, CD- or DVD-ROM drive, PC-card slots, other types of optical or magnetic media drives, and the like. Additionally, the computer may be of modular design, i.e., containing multipurpose slots or bays wherein peripheral devices may be swapped in and out, although the present invention is described herein primarily in reference to an LCD display, wherein the brightness level is typically adjusted by adjusting the brightness of a backlighting panel such as an electroluminescent panel or side- or edge-lighting fluorescent tubes. LCD brightness may also be adjusted by the degree of liquid crystal modulation. It will be recognized that the present invention may be employed with any other type of display used on portable computers or other portable electronic devices having a display and capable of being operated on two or more selectable power sources. Other such displays include, but are not limited to, cathode ray tube (CRT) displays, plasma display panels, electroluminescent displays, vacuum fluorescent displays, cathodoluminescent (field emission) displays, and the like.

Computer 10 is capable of being powered by a battery power source which may comprise one or more batteries or battery packs 20, typically housed within housing 22 of computer 10. The battery 20 will typically be of the rechargeable type, such as nickel-cadmium, nickel-metal hydride, or lithium ion type batteries. Computer 10 is also capable of being powered by an external power source, typically an AC adapter (not shown), which may also serve to recharge the computer's battery 20. Other examples of external power sources include automotive adapter, high capacity external battery packs and the like. For purposes of this discussion, the display brightness reduction according to the present invention will be described primarily and generally in reference to a system wherein the power saving display brightness reduction feature is activated when a user switches from an external adapter, primarily an AC adapter, to the computer's internal batteries. However, it will be understood that the performance and power management characteristics in effect when external power sources other than an AC adapter are in use may vary according to manufacturer and will often be user selectable.

LDC display 12 may be manually adjusted using controls such as display brightness control 24 and, when applicable, contrast control 26. Such controls may be, for example, multiposition switches, sliders, or the like, located on the housing surface of computer 10 or the housing of display 12. Advantageously, the display parameters, such as brightness and contrast, may be user adjustable through keys on keyboard 14 (e.g., through dedicated keys or through keys which may have multiple actions which may be selected by pressing a key in combination with one or more special function keys). The use of special function keys that allow individual keys to have more than one action is known in the art and particularly advantageous for keyboards of portable devices in that reducing the number of keys allows the device to be made smaller.

Computer 10 may be any microprocessor-based electronic device, such as a portable general purpose computer, e.g., a computer employing IBM PC compatible type architecture. Computer 10 is depicted as a notebook computer in FIG. 1 to illustrate a presently preferred embodiment, although other types of portable computers are known in the art and may advantageously employ the display brightness reduction according to the present invention. Other types of portable computers include, for example, laptop computers which are generally larger than notebook computers, sub-notebook computers which are generally smaller than notebook computers, and hand-held computers which include, for example, palmtop computers, personal digital assistants (PDAs), hand-held data collection terminals, and the like.

Figure 2:
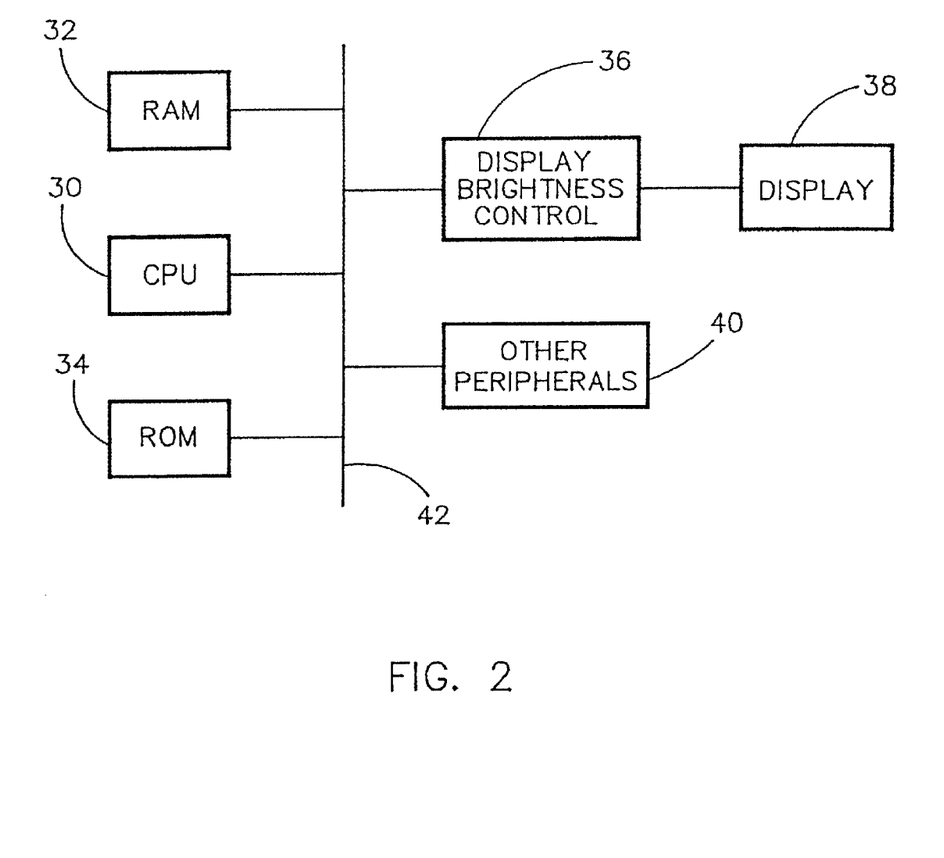
FIG. 2 is a block diagram showing the architecture of a typical general purpose computer, such as the type shown in FIG. 1.

FIG. 2 shows a block diagram of the architecture of a computer which may be employed in conjunction with the present invention. The computer comprises a central processing unit (CPU) 30, main system memory (RAM) 32, a ROM 34 having a Basic Input/Output System (BIOS) programmed therein, a display 38, with display brightness control circuitry 38. The system may include other peripherals, designated generally as reference numeral 40, which may include a keyboard, hard disk drive, optical media drive such as a CD- or DVD-ROM drive, pointing device, printer, etc. The various components are interconnected via data bus 42.

Figure 3A:
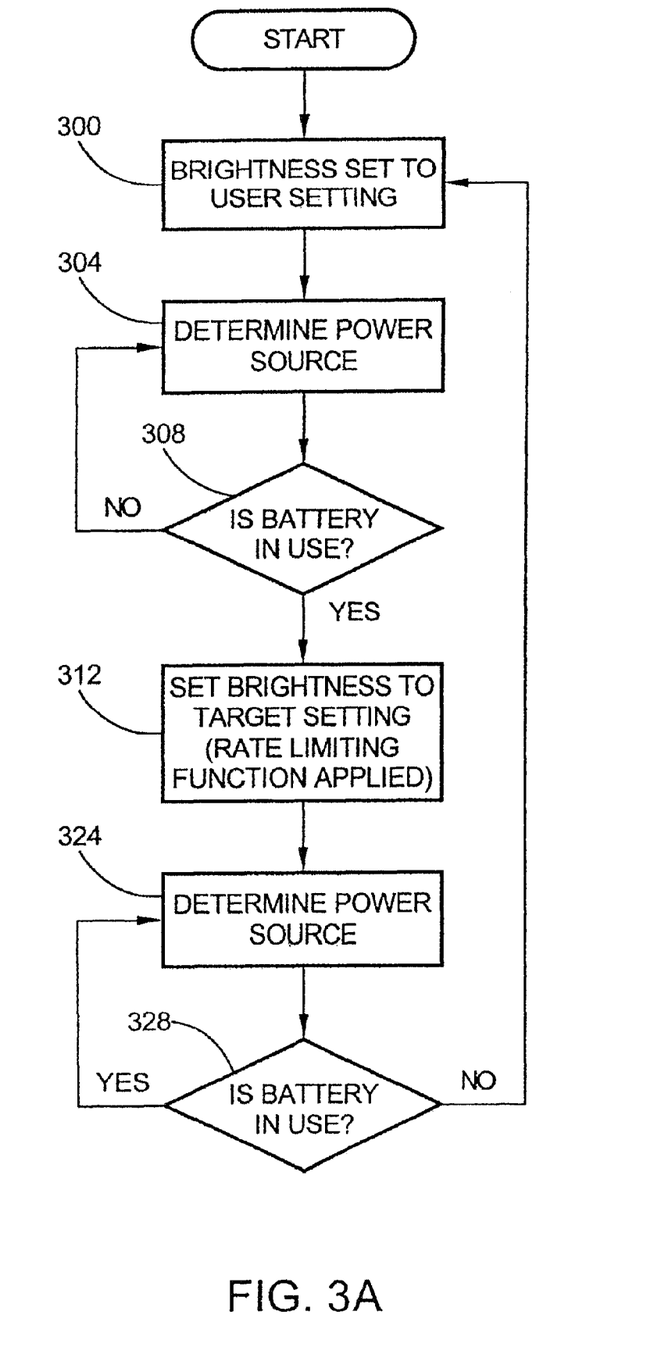
FIGS. 3A and 3B are flow charts outlining a basic embodiment of the method of reducing display brightness according to the present invention.

FIG. 3A shows a flow chart outlining a method according to the present invention. The process of FIG. 3A begins with the computer drawing power from an external source, such as an AC adapter, and the internal battery not being used (and possibly being charged). Accordingly, since battery consumption is not a concern, the display brightness level is set to the brightness level set by the user (step 300).

The user selected brightness level remains in effect until the system detects a change in the power source from the external source to the internal batteries (step 304). If the user switches to battery use, e.g., by removing the AC power adapter (step 308), the brightness level is then reduced in step 312 to some predetermined or preselected target brightness level designed to provide longer battery life. In an embodiment, the user setting is logged so that the user selected brightness level may be restored if the user subsequently reconnects the AC adapter. In reducing the brightness level in step 312, a rate limiting function is applied so as to hide the reduction from a user's perspective. The rate of brightness reduction is preferably such that the brightness reduction is virtually unnoticeable to a user.

Figure 3B:
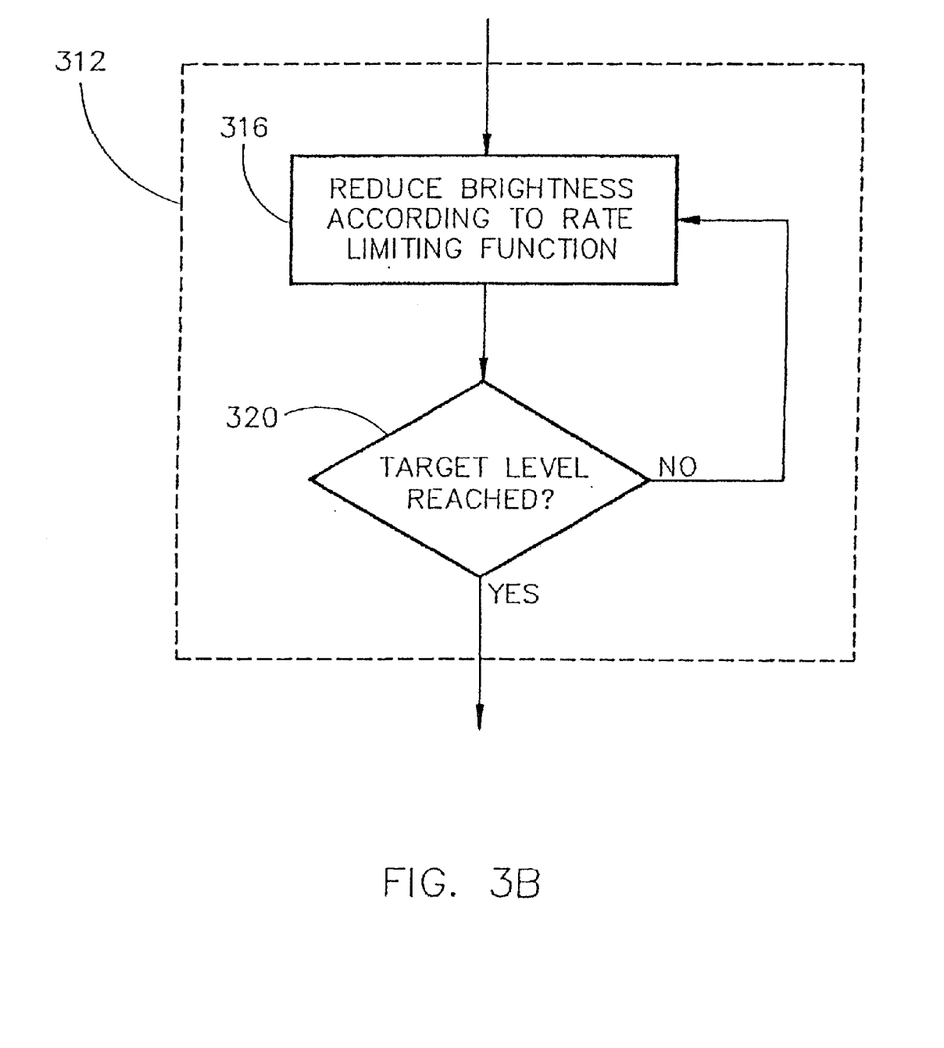

Referring now to FIG. 3B, there is depicted a flow chart illustrating in greater detail the implementation of step 312 of FIG. 3A. When battery use is detected in step 308 (FIG. 3A), the brightness level is then gradually or incrementally reduced according to the rate limiting function in accordance with the present invention in step 316. In step 320, if the target brightness level has not been reached, the process returns to step 316 and the gradual brightness reduction continues. If the target brightness level is reached in step 320, the process continues to step 324 (FIG. 3A).

Referring again to FIG. 3A, after the target brightness level has been set (step 312), the system continues to wait for a change in the power source (step 324). As long as the battery remains in use (step 328), the process returns to step 324 and the display brightness level remains at the target setting (unless it is manually readjusted by the user). If the user then switches from the battery to an external power source, e.g., by reconnecting the AC adapter, the process then returns to step 300 and the brightness level is set to the original user setting.

The rate limiting function may be implemented in a number of ways, for example, (1) by limiting the rate to a maximum incremental brightness decrease per unit time, for instance the rate limiting function may use a percentage decrease application which limits the incremental brightness decrease to a specific percentage or (2) by setting a minimum time period, for instance the rate limiting function may utilize a ten second time period delay to accomplish the change to the target brightness level, preferably a time period delay of thirty seconds is applied, or (3) a fixed time period over which the entire brightness change may occur, for instance a fixed time period of seconds, a few minutes, five minutes, ten minutes, or any other fixed time period may be applied, preferably a fixed time period of one minute is utilized by the rate limiting function of the present invention. The rate limiting function ensures that the rate of change (or rate of reduction) made to the display brightness level is accomplished in a manner which is substantially undetectable/unnoticeable to the eye of the user. Thus, when a change in the power source is detected by the present invention, the target brightness level is achieved without a noticeable visual disruption to the user.

The present invention is preferably implemented in the system BIOS by incorporating therein a routine that changes LCD brightness over time in accordance with this teaching. In one embodiment, the target brightness level is adjustable in software, e.g., by providing a field in system setup or configuration software that allows a user to select or adjust the target level.

The target level may be determined in a number of ways. For example, it may be a fixed or preselected brightness level, and, as stated above, may be user adjustable, e.g., via a BIOS setup program or other software environment. Alternatively, the target level maybe calculated as some percentage of, or increment relative to, the current or most recent user selected brightness level. In the latter case, where the target level is reduced relative to the user selected brightness level, the target brightness level will always be less than the user setting. However, in the former case, where target brightness level is a fixed brightness level, i.e., one that offers suitable battery conservation but that is independent of the current user setting, it is conceivable that a user may select a brightness level that is less than the predetermined or preselected target brightness level. In that case, where the user switches from the AC power source to battery use, it is preferable that the brightness level not be changed to the target level, but rather, that the user setting remain in effect.

Thus, where the target level is user selectable, a user may select the target level, either as (1) a predetermined brightness level, such as a percentage of the maximum brightness of which the display is capable, (2) some percentage or incremental decrease based on the brightness setting in use prior to the brightness reducing event (e.g., switching from an AC power adapter to battery use), or (3) a combination thereof. The rate limiting function of the present invention is used to achieve the target brightness level, regardless of the pathway chosen by the user. Through application of the rate limiting function the change to the target brightness level is substantially unnoticeable/undetectable to the user.

For example, if the target level is some percentage of maximum display brightness, and a user is using a brightness level that is equal to or less than such target level at the time of the level reducing event, it may be desirable to effect no change in brightness upon a switch to battery usage since the target level is determined to provide an adequate or desired level of power savings and, in such case, the display brightness level is already at or below such level.

Alternatively, if the target level is some percentage or incremental decrease based on the brightness setting in use prior to the brightness reducing event, then some brightness reduction will be effected whenever the brightness reducing event occurs, regardless of the user setting. This change in the brightness level, unnoticeable by the eye of the user, may be effected through any of the methods outlined previously.

In yet another alternative, the target level may be some predetermined brightness level, such as a percentage of the maximum display brightness where the current user setting is above such predetermined level, and some percentage or incremental decrease based on the current user setting if the current user setting is below such predetermined level.

It will be recognized that there is advantageously a minimum brightness setting below which a display brightness reduction performed in accordance with the present invention will not be effected, for example, in order to avoid completely or nearly completely blanking the screen.

It will be recognized by those skilled in the art that it is not necessary that the present invention be implemented by controlling the video hardware via the BIOS interface as stated above, and that the present invention may be implemented, for example, in software that controls the video hardware directly.

In accordance with the present invention, it is not necessary that the rate limiting function be applied to all changes in display brightness level. In an embodiment, the rate limiting function is applied only during automatic brightness level changes initiated by a power management feature of the computer. For example, if a user manually adjusts the brightness level, e.g., via control 24 (FIG. 1), it may be desirable that such changes occur immediately to provide visual feedback to the user as to the changes made. Thus, any manual brightness level changes may occur without employing the rate limiting function. Further, the user may visually notice the change in brightness level as it occurs, unlike the situation where the rate limiting function ensures that the change in brightness level is substantially unnoticeable to the eye of the user.

In an embodiment, the rate limiting function is applied only when a power management feature of the system calls for a reduction in display brightness, e.g., automatic display brightness reductions that occur when a user switches from the use of an AC adapter or other external power supply to the use of a battery.

Also, in an embodiment, the present invention does not preclude the user from overriding the power management feature, i.e., by readjusting the display brightness level after it has been automatically reduced in accordance with the present invention.

Although the present invention is discussed here in reference to preferred embodiments wherein the display brightness level is adjusted immediately upon switching to battery usage, or shortly thereafter, it will be recognized that many variations in the implementation of the rate limited brightness reduction according to the present invention are possible. For example, in an alternative embodiment of the invention, the rate limited brightness reduction need not begin gradually reducing screen brightness immediately upon use of the battery, but rather, the rate limited brightness reduction may be delayed, for example, occurring after a prespecified time delay (for example, on the order of seconds, minutes, or tens of minutes), or after a certain amount of the battery's charge has been consumed, e.g., when the battery's voltage reaches a certain threshold value, or when the estimated remaining work time (for example, as estimated by software as is known in the art) reaches a certain value. Where a computer is capable of operating on two or more batteries, the display brightness reduction may be set to occur, for example, after the first battery has been consumed.

Figure 4:
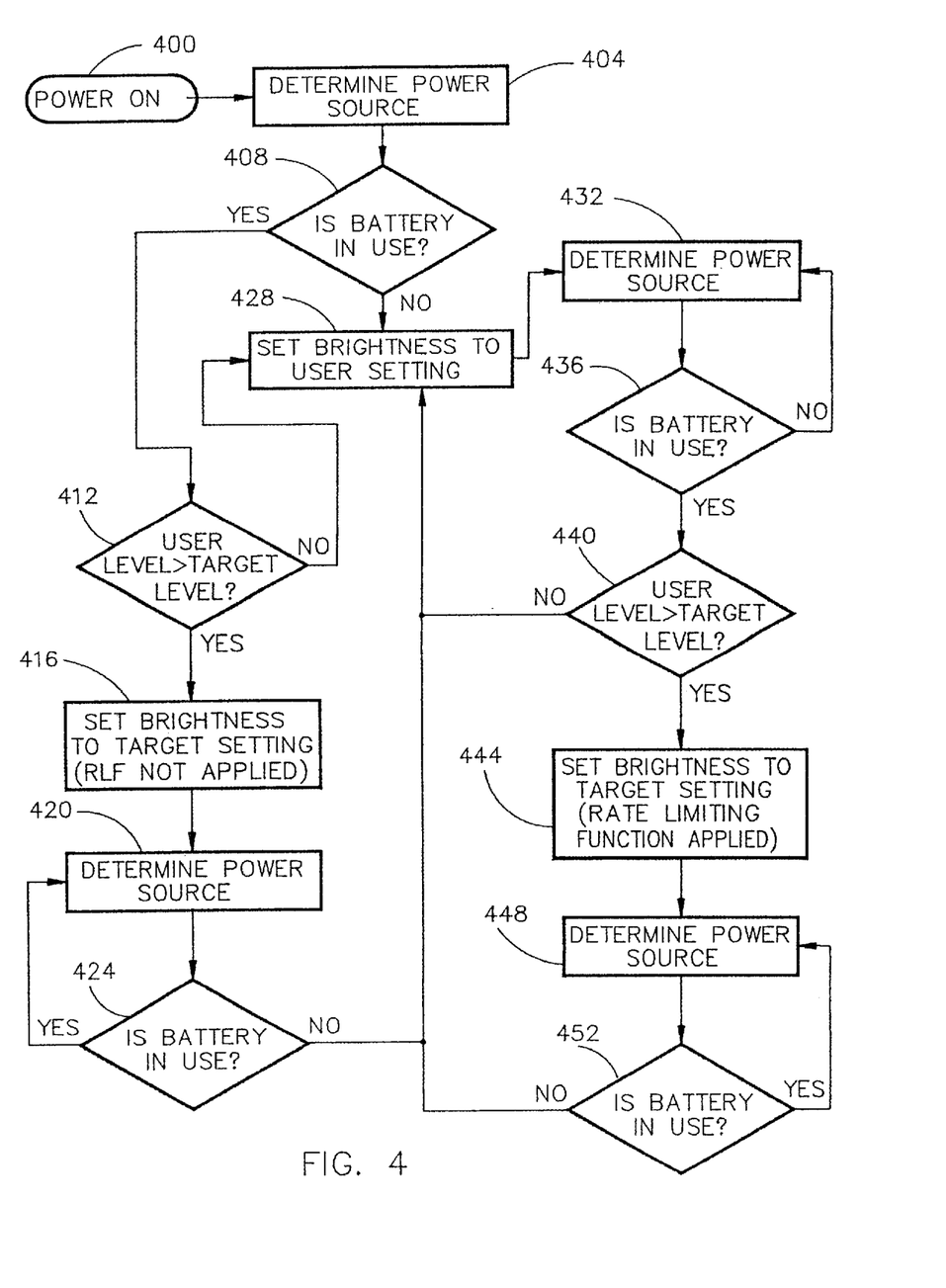
FIG. 4 is a flow chart outlining another embodiment of the method of reducing display brightness according to the present invention.

Referring now to FIG. 4, a more detailed flow chart outlining the operation of the present invention is shown. The system is powered on (or, alternatively, awakened from a low power sleep mode) in step 400. In step 404, it is determined whether the battery is in use. If the battery is in use in step 408, it is determined whether the user selected brightness level is greater than the target level in step 412. If the user selected brightness level is not greater than the target brightness level, then the display brightness is set to the user selected brightness level in step 428.

In an embodiment, if the user selected brightness level is greater than the target level in step 412, then the display brightness is set to the target level. Since, in step 416, the user has powered on or awakened the system while the unit is operating on battery power, the target brightness setting in step 416 is the initial brightness setting that the user sees. Since there is no change in display brightness, no dramatic drop in brightness will be noticed by the user and, accordingly, it is not necessary to implement the rate limiting function at step 416.

Since the battery is in use in step 416, the system will wait for a change in the power supply. In step 420, the power supply is checked and if battery use continues in step 424, the display brightness will remain at the target brightness level. If the user subsequently switches to the AC adapter or other external power source, the battery will no longer be in use in step 424, and the display brightness can then be set to the original user selected brightness level in step 428. Although the display brightness increase in step 428 may, of course, also be gradual in the same manner as the display brightness decrease, it is not necessary to apply a rate limit to the brightness change, since the display brightness is being increased and since the batteries are not being used.

If the battery is not in use in step 408, the display brightness is set to the user selected brightness level in step 428.

After the display brightness is set to the user selected brightness level in step 428, i.e., if the computer is using an AC adapter, the process continues to steps 432 and 436 wherein the power source is determined. When a switch by the user from the AC adapter to battery use is detected in step 436, the process proceeds to step 440 wherein it is determined whether the user brightness level is greater than the target brightness level. If the user selected brightness level is not greater than the target brightness level, then the display brightness is set to the user selected brightness level in step 428.

If the user selected brightness level is greater than the target brightness level in step 440, the display brightness is reduced to the target level in step 444 in a rate limited fashion in accordance with this teaching. In an embodiment, the rate of brightness reduction is such that the user does not notice a sudden and marked change in display brightness. In another embodiment, the rate of brightness reduction is performed in a manner that is unnoticeable or substantially unnoticeable to the user, as discussed previously. The discussion above of step 312 in FIGS. 3A and 3B is applicable to step 444 of FIG. 4 as well.

In step 448, the power source in use is continued to be monitored. So long as the battery remains in use (step 452), the display brightness level remains at the target setting. If the user subsequently switches to the AC adapter or other external power source, the battery will no longer be in use in step 452, and the display brightness level is then set to the original user selected brightness level in step 428 and the process continues to step 432.

It will be recognized that where the target level determined as being some percentage or increment lower than the user setting, the user level will always be greater than the target level and thus steps 412 and 440 may be omitted. In such case, if the battery is in use in step 408, the process will continue directly to step 416. Likewise, if the battery is in use in step 436, the process will continue directly to step 444.

It will also be recognized that the rate limited brightness reduction according to the present invention need not be employed as the sole power conservation feature, but may be used in conjunction with other power conservation techniques, including, but not limited to, hard disk drive spin down after a prespecified period of nonuse, reducing the display brightness after a prespecified period of nonuse, powering off the display after a prespecified period of nonuse, powering off the computer after a prespecified period of nonuse, reducing the processor operating speed when battery operation is selected, and entering a low power sleep mode after a prespecified period of nonuse.

The description above should not be construed as limiting the scope of the invention, but as merely providing illustrations to some of the presently preferred embodiments of this invention. In light of the above description and examples, various other modifications and variations will now become apparent to those skilled in the art without departing from the spirit and scope of the present invention as defined by the appended claims. For example, in addition to portable computers, the present invention may be implemented with any other portable electronic device employing a display screen wherein it would be desirable to reduce display screen brightness when the device is switched from operating on an AC adapter or other external power source to a battery. Such devices include, but are not limited to, portable displays or other portable computer peripherals, cellular telephones, video camcorders, portable televisions, portable video players such as portable DVD players, electronic games, portable laboratory or medical equipment, and the like. Accordingly, the scope of the invention should be determined solely by the appended claims and their legal equivalents.

What is claimed is:

1. A method for conserving battery power in a portable computer, said computer being of the type operable on power supplied by a battery power source and an external power source, comprising the steps of:

detecting a change from the external power source to the battery power source;

reducing display brightness gradually from a user selected brightness level to a target brightness level if the target brightness level is less than the user selected brightness level; and leaving the display brightness level unchanged if the target brightness level is not less than the user selected display brightness level, wherein the step of reducing the display brightness gradually occurs through use of a rate limiting function so as to be substantially undetectable to a user when battery operation is detected.

2. The method according to claim 1, wherein said computer is further of the type having a hard disk drive and wherein said method further comprises the step of spinning down said hard disk drive after a prespecified period of nonuse.

3. The method according to claim 1, wherein said method further comprises the step of reducing the display brightness after a prespecified period of nonuse.

4. The method according to claim 1, wherein said method further comprises the step of powering off the display after a prespecified period of nonuse.

5. The method according to claim 1, wherein said method further comprises the step of powering off the computer after a prespecified period of nonuse.

6. The method according to claim 1, wherein said method further comprises the step of reducing a processor operating speed when battery operation is selected.

7. The method according to claim 1, wherein said method further comprises the step of putting the computer into a low power sleep mode after a prespecified period of nonuse.

8. The method according to claim 1, wherein said method further comprises the step of increasing display brightness to a user selected brightness level when external power operation is selected.

9. An apparatus for conserving battery power in a portable computer, said computer being of the type operable on power supplied by a battery power source and an external power source, said apparatus comprising:

means for detecting a change from the external power source to the battery power source; and means for reducing display brightness gradually from a user selected brightness level to a target brightness level if the target brightness level is less than the user selected brightness level; and means for leaving the display brightness level unchanged if the target brightness level is not less than the user selected display brightness level, wherein the means for reducing the display brightness gradually occurs through use of a rate limiting function so as to be substantially undetectable to a user when battery operation is detected.

10. The apparatus according to claim 9, said computer is further of the type having a hard disk drive and further comprising means for spinning down said hard disk drive after a prespecified period of nonuse.

11. The apparatus according to claim 9, comprising means for further reducing the display brightness after a prespecified period of nonuse.

12. The apparatus according to claim 9, comprising means for powering off the display after a pre specified period of nonuse.

13. The apparatus according to claim 9, comprising means for powering off the computer after a prespecified period of nonuse.

14. The apparatus according to claim 9, comprising means for reducing a processor operating speed when battery operation is selected.

15. The apparatus according to claim 9, comprising means for putting the computer into a low power sleep mode after a prespecified period of nonuse.

16. The apparatus according to claim 9, further comprising means for increasing display brightness to a user selected brightness level when external power operation is selected.

* * * * *